(12) United States Patent
Dafonseca et al.

(10) Patent No.: US 10,279,367 B2
(45) Date of Patent: May 7, 2019

(54) SPRINKLER ASSEMBLY CONNECTOR FOR FLEXIBLE CONDUIT

(71) Applicant: Anvil International, LLC, Exeter, NH (US)

(72) Inventors: Odair Dafonseca, Pawtucket, RI (US); Joseph Beagen, Providence, RI (US)

(73) Assignee: Anvil International, LLC, Exeter, NH (US)

( * ) Notice: Subject to any disclaimer, the term of this patent is extended or adjusted under 35 U.S.C. 154(b) by 88 days.

(21) Appl. No.: 15/290,144

(22) Filed: Oct. 11, 2016

(65) Prior Publication Data

US 2018/0099167 A1 Apr. 12, 2018

(51) Int. Cl.

| | | |
|---|---|---|
| *B05B 15/658* | (2018.01) | |
| *A62C 35/62* | (2006.01) | |
| *A62C 35/68* | (2006.01) | |
| *B05B 15/62* | (2018.01) | |
| *A62C 35/64* | (2006.01) | |
| *F16L 3/10* | (2006.01) | |
| *A62C 3/00* | (2006.01) | |

(52) U.S. Cl.
CPC ............ *B05B 15/658* (2018.02); *A62C 3/004* (2013.01); *A62C 35/62* (2013.01); *A62C 35/645* (2013.01); *A62C 35/68* (2013.01); *B05B 15/62* (2018.02); *F16L 3/1075* (2013.01)

(58) Field of Classification Search
CPC ......... A62C 3/004; A62C 35/62; A62C 35/68; A62C 35/645; B05B 15/62; B05B 15/658; F16L 3/1075; F16L 3/24

USPC ........ 169/16, 37, 17, 41; 239/208, 209, 282, 239/283, 588; 248/75, 342, 343; 52/39, 52/506.06, 506.07

See application file for complete search history.

(56) References Cited

U.S. PATENT DOCUMENTS

| | | | | |
|---|---|---|---|---|
| 2,017,841 | A * | 10/1935 | Coleman | A62C 35/605 169/16 |
| 6,158,519 | A * | 12/2000 | Kretschmer | A62C 35/645 169/16 |
| 6,241,024 | B1 * | 6/2001 | Haase | A62C 35/60 239/208 |
| 9,345,918 | B2 * | 5/2016 | Bucher | A62C 37/11 |
| 9,511,248 | B2 * | 12/2016 | Szentimrey | A62C 35/68 |
| 2011/0215566 | A1 * | 9/2011 | Stempo | A62C 35/68 285/144.1 |
| 2015/0122513 | A1 * | 5/2015 | Miller | A62C 35/62 169/37 |

* cited by examiner

*Primary Examiner* — Steven J Ganey
(74) *Attorney, Agent, or Firm* — Taylor English Duma LLP

(57) ABSTRACT

Provided herein is a sprinkler system including a compact-design connector coupling a flexible conduit to a sprinkler body. In one approach a sprinkler assembly includes a t-joint connector, a sprinkler body (e.g., a dry-type pendent body) coupled to the t-joint connector at a first opening of the t-joint connector, and a flexible conduit coupled to the t-joint connector at a second opening of the t-joint coupling. The sprinkler assembly may further include an adjustable bracket coupling the sprinkler body to a building structure, such as a ceiling or wall. The t-joint connector eliminates the use of an elbow-type connection to a flexible hose, thus enabling use in a freezer/cooler application, while also reducing the overall footprint of the sprinkler assembly.

18 Claims, 6 Drawing Sheets

SPRINKLER ASSEMBLY CONNECTOR FOR FLEXIBLE CONDUIT

BACKGROUND OF THE DISCLOSURE

Field of the Disclosure

The present disclosure relates to sprinkler assemblies and, more particularly, to a fire protection sprinkler system including a flexible conduit secured at t-joint connector.

Discussion of Related Art

Conventional automatic fire sprinkler systems include a network of pipes that carry a fire suppressant (e.g., a fluid) to one or more rooms in a building. Conduit sections carry the fluid from the pipes to sprinkler heads strategically located in different rooms. The position and orientation of each sprinkler head is typically maintained in place by a support assembly. When the room reaches an elevated temperature due to a fire, the sprinkler head is activated allowing a stream of fire suppression fluid to be directed over the intended area of coverage.

In certain applications or environments with temperatures below freezing, dry-type sprinklers may be used. The dry-type sprinklers can be installed in either an upright, sidewall, or a pendent position, according to design. Generally speaking, dry pipe sprinklers comprise a sprinkler adapted to be installed in a piping system, the sprinkler having a valve at the inlet end to prevent water or other fire extinguishing fluid in the pipeline from entering the sprinkler until the sprinkler is put into operation by collapse of a thermally responsive mechanism. The valve end of the sprinkler is screwed into or otherwise attached to a fitting in the water supply piping.

In many warehouse coolers and freezers, the compartment that is controlled at a cool or freezing temperature is a box enclosure within a heated warehouse or building compartment. However, current dry pipe sprinkler technology used in cooler/freezer applications include extended pipe lengths, which may be problematic given the limited space available in typical ceiling grids of coolers and freezers.

SUMMARY OF THE DISCLOSURE

In view of the foregoing, there is a need in the art for a dry-type sprinkler assembly employing a more compact design to alleviate the problems of conventional systems. Provided herein is a sprinkler system including flexible hosing and a compact-design connector that satisfies applicable fire codes and standards, and that reduces the overall footprint of the sprinkler assembly, thus enabling use in a freezer/cooler application. In one approach, a sprinkler assembly includes a t-joint connector connecting a sprinkler body (e.g., a dry-type pendent) to a flexible conduit. The t-joint connector may include a first opening for securing the sprinkler body to the t-joint connector, a second opening for securing the flexible conduit to the t-joint connector, and a third opening for securing a plug to the t-joint connector. The sprinkler assembly may further include an adjustable bracket coupling the sprinkler body to a building structure, such as a ceiling or wall.

One approach according to the disclosure includes a sprinkler assembly having a t-joint connector, a sprinkler body coupled to the t-joint connector at a first opening of the t-joint connector, a flexible conduit coupled to the t-joint connector at a second opening of the t-joint coupling, and an adjustable bracket coupled to the sprinkler body.

Another approach according to the disclosure includes a sprinkler system having a t-joint connector, a dry-type pendent sprinkler body coupled to the t-joint connector at a first opening of the t-joint connector, a flexible metal conduit coupled to the t-joint connector at a second opening of the t-joint coupling, and an adjustable bracket coupling the dry-type pendent sprinkler body to a building structure.

BRIEF DESCRIPTION OF THE DRAWINGS

The accompanying drawings illustrate exemplary approaches of the disclosure, including the practical application of the principles thereof, and in which.

Figure 1:
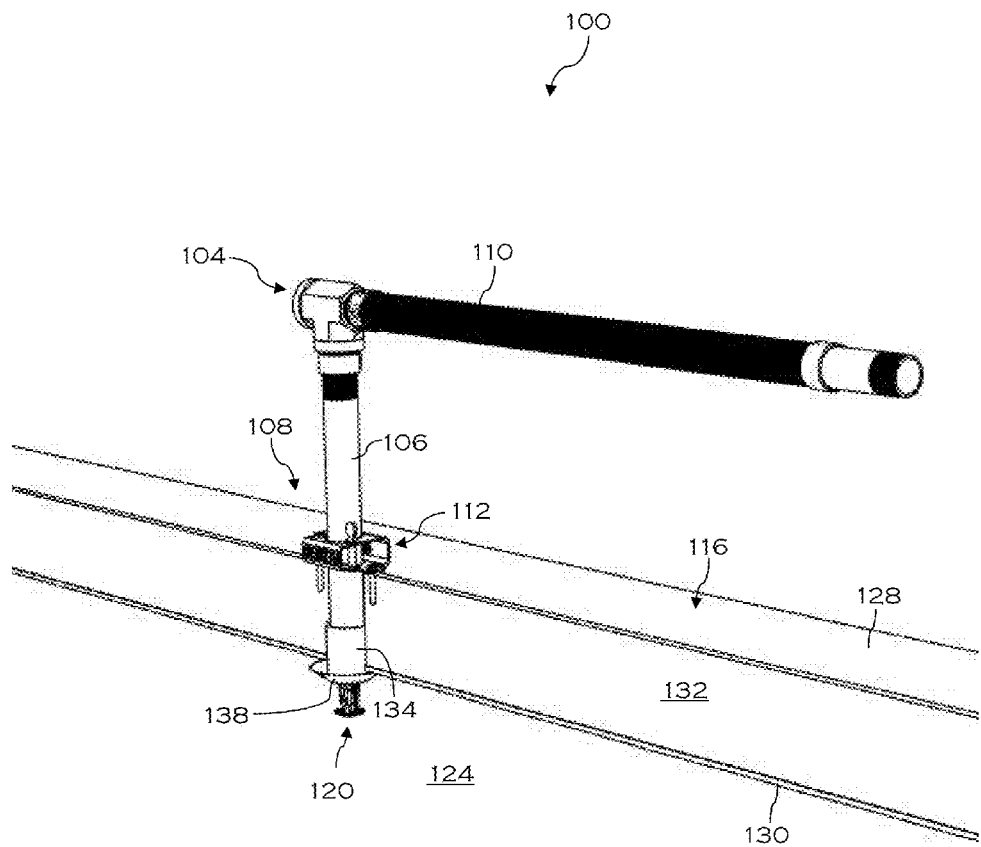
FIG. 1 is an isometric view of a sprinkler assembly according to exemplary approaches of the disclosure.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the disclosed torch handle may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

As stated above, provided herein is a sprinkler system including a compact-design connector for securing a flexible conduit to a sprinkler body. In one approach a sprinkler assembly includes a t-joint connector (i.e., t-shaped attachment device), a sprinkler body (e.g., a dry-type pendent) coupled to the t-joint connector at a first opening of the t-joint connector, and a flexible conduit coupled to the t-joint connector at a second opening of the t-joint coupling. The sprinkler assembly may further include an adjustable bracket coupling the sprinkler body to a structure such as a ceiling or wall. The flexible conduit and t-joint connector satisfy applicable fire codes and standards, and reduce the overall footprint of the sprinkler assembly, thus enabling use in a freezer/cooler application.

Figure 2:
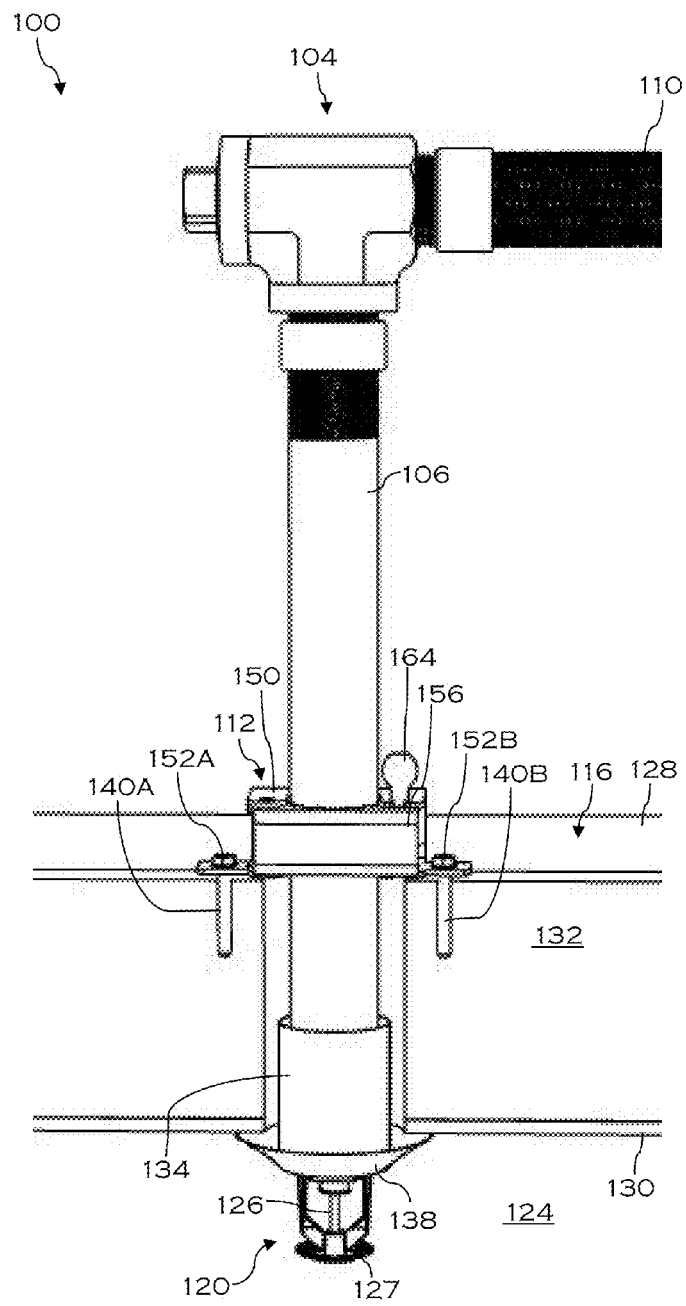
FIG. 2 is a side view of the sprinkler assembly of FIG. 1 according to exemplary approaches of the disclosure.

Referring now to FIGS. 1-2, a sprinkler assembly/system, which may be a dry-type fire suppression sprinkler assembly, will be described in greater detail according to exemplary embodiments of the disclosure. As shown, the sprinkler assembly 100 may include a t-joint connector (hereinafter "connector") 104, joining together a sprinkler body 106 with a flexible conduit 110. The sprinkler assembly 100 may further include an adjustable bracket 112 coupling the sprinkler body 106 to a ceiling 116, which is shown partially cutaway for ease of viewing. A thermally responsive sprinkler head 120 extends downward from the sprinkler body 106, through an opening 122 in the ceiling 116, and into an environment 124 to be protected, which may be a cooler or freezer. In other embodiments, the sprinkler head 120 may be formed through a wall instead of through the ceiling.

In some embodiments, the sprinkler body 106 may be a dry-type pendent sprinkler body that acts as a conduit for a fire suppressant. In the event of a fire, a thermally responsive device 126 of the sprinkler head 120 reacts to heat generated by the fire to allow fluid to flow through the sprinkler body 106 and into a deflector 127, where the fluid is dispersed outwardly to extinguish the fire. Although a fluid commonly used in such dry sprinklers is water, other fire retardant fluids including nitrogen and halogen, may also be used in various embodiments.

As shown, the sprinkler body 106 is positioned to extend through the opening 122 in the ceiling 116. In the case that the environment 124 is a freezer, the ceiling 116 may include an outer wall 128 (e.g., a metal plate), an inner wall 130, and a layer of insulation 132 disposed between the inner and outer walls 130, 128. The sprinkler body 106 is positioned through the opening 122 such that the sprinkler head 120 is positioned within cold environment 124. In some embodiments, the sprinkler body 106 may include a sleeve 134 disposed along a lower portion thereof, and an escutcheon 138 surrounding the sprinkler head 120. As shown, a lower portion of the sleeve 134 extends from the opening 122 and is engaged by the escutcheon 138.

Figure 3A:
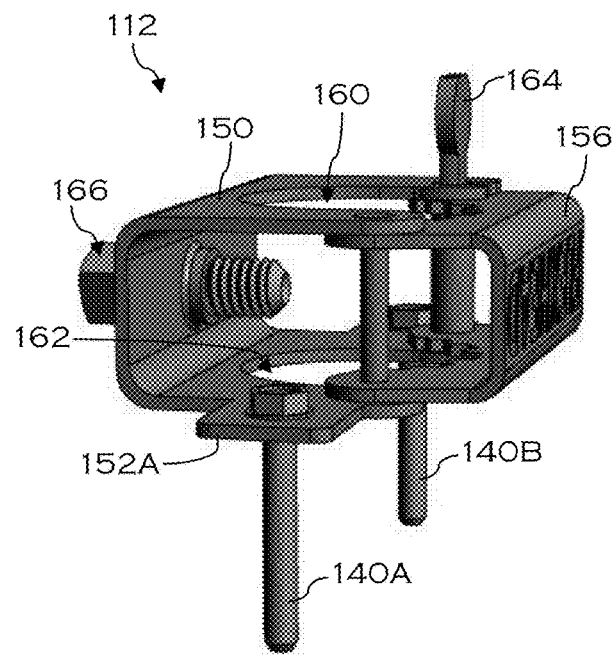
FIG. 3A is an isometric view of an adjustable bracket of the sprinkler assembly of FIG. 1 according to exemplary approaches of the disclosure.
Figure 3B:
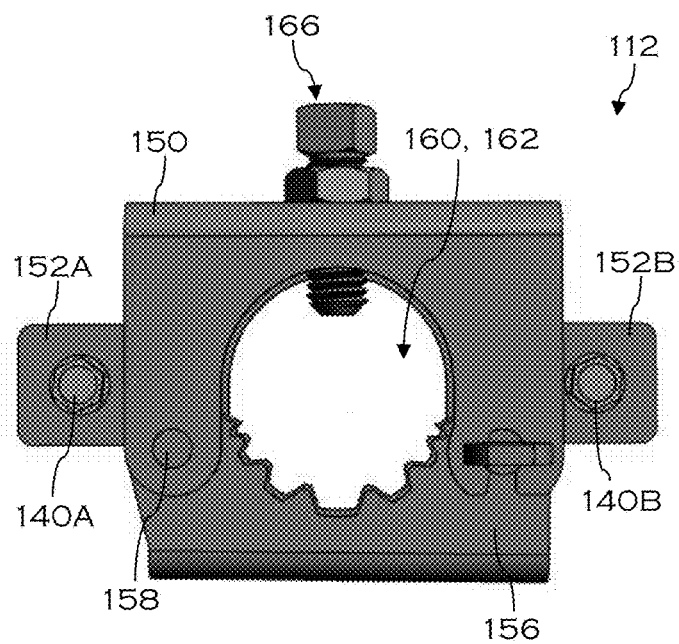
FIG. 3B is a top view of the adjustable bracket of FIG. 3A according to exemplary approaches of the disclosure.
Figure 4:
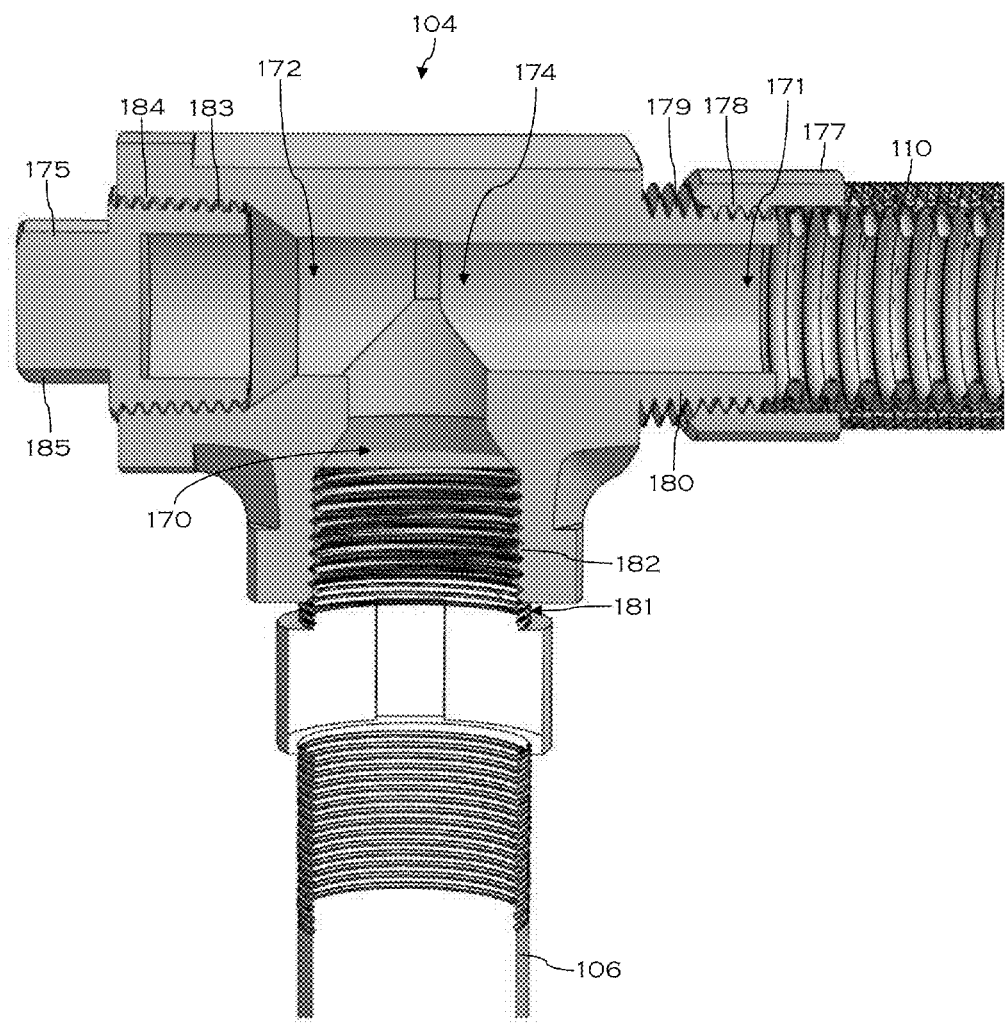
FIG. 4 is a side cutaway view of a t-joint connector of the sprinkler assembly of FIG. 1 according to exemplary approaches of the disclosure.
Figure 5:
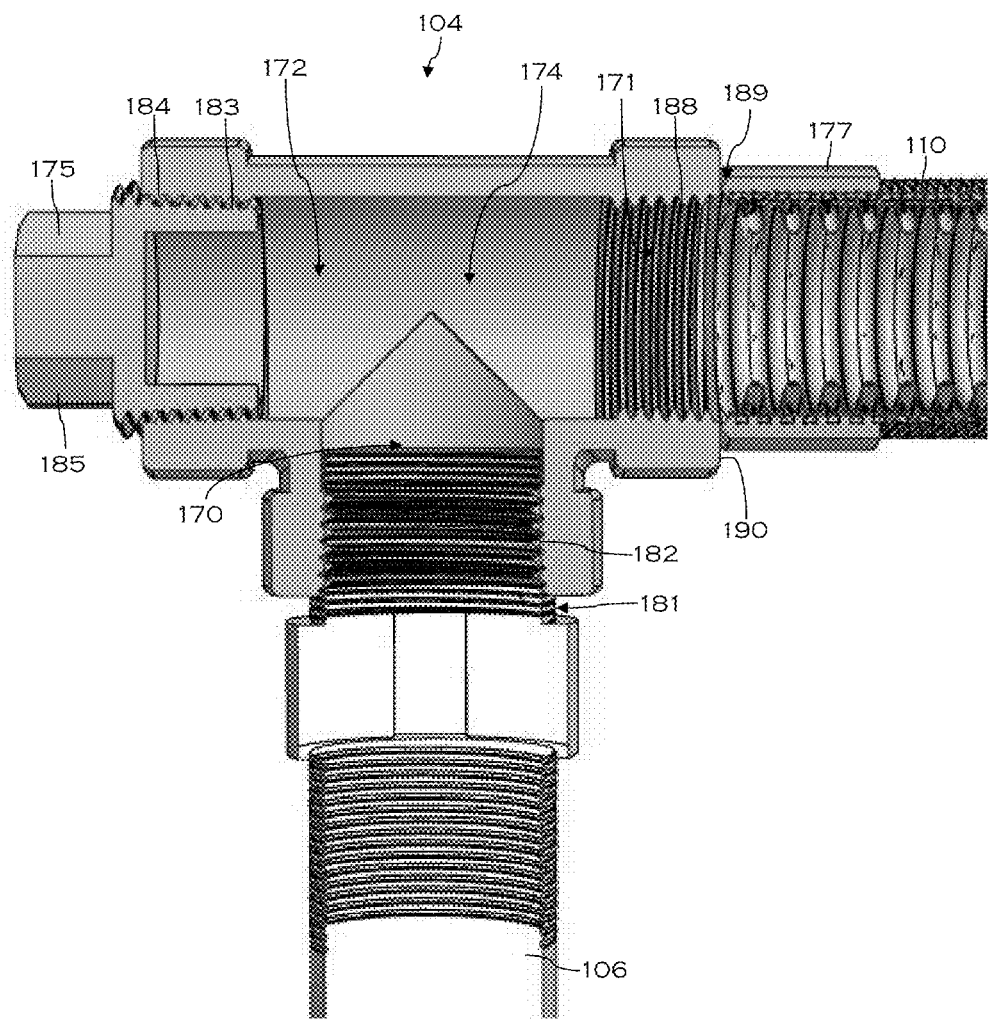
FIG. 5 is a side cutaway view of a t-joint connector of the sprinkler assembly of FIG. 1 according to exemplary approaches of the disclosure.
Figure 6:
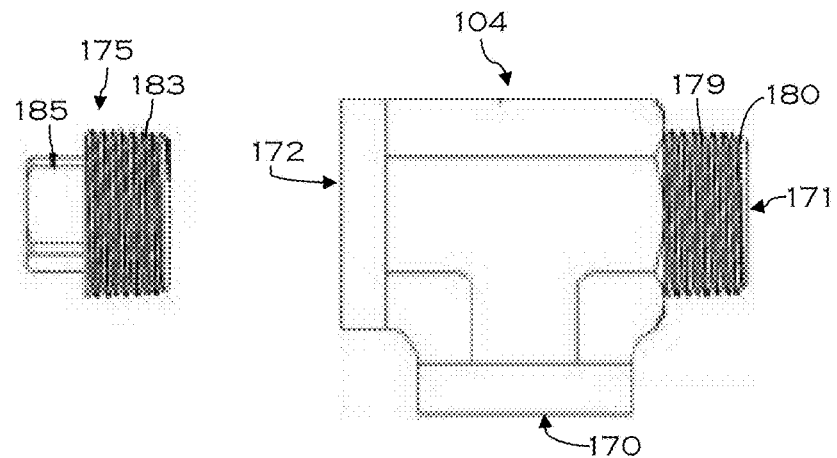
FIG. 6 is an exploded side view of a t-joint connector of the sprinkler assembly of FIG. 1 according to exemplary approaches of the disclosure.
Figure 7A:
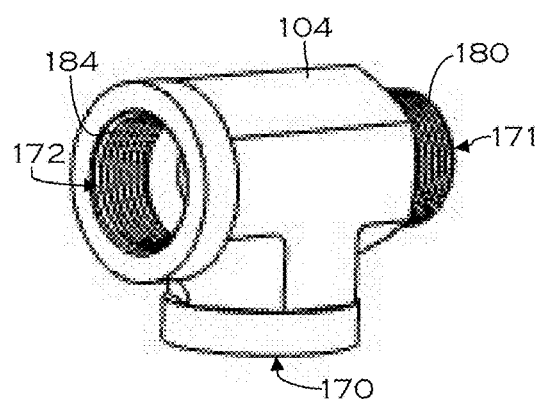
FIG. 7A is an isometric view of the t-joint connector of the sprinkler assembly of FIG. 1 according to exemplary approaches of the disclosure.
Figure 7B:
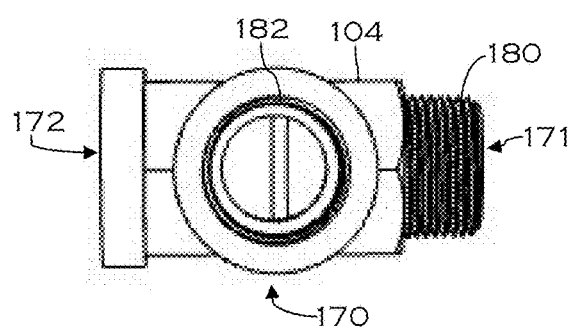
FIG. 7B is a bottom view of the tip adaptor of FIG. 7A according to exemplary approaches of the disclosure.

In exemplary embodiments, the sprinkler body 106 is secured to the ceiling 116 by the adjustable bracket 112 using, for example, a set of fasteners 140A-B extending through the outer wall 130 and into the layer of insulation 132. As shown in FIGS. 2-3B, the adjustable bracket 112 may be a hub assembly including a primary support 150 including a set of laterally extending tabs 152A-B, which mount to the outer wall 130 via the set of fasteners 140A-B, and a secondary support 156 that is rotatably connected to the primary support 150. The secondary support 156 rotates relative to the primary support 150 about a pin 158 between an open position (not shown) and a closed position (shown). The primary support 150 and secondary support 156 are each formed having cut out portions 160, 162, so that when the secondary support 156 is in the closed position relative to the primary support 150, the cut out 160 formed in the primary support 150 cooperates with the cut out 162 formed in the secondary support 156 to define a hub opening configured to receive and securely retain the sprinkler body 106 therein. When the adjustable bracket 112 is secured to the ceiling 116, the hub opening coincides with the opening 122 through the ceiling 116. In addition, the adjustable bracket 112 includes a locking mechanism 164 that selectively connects the primary support 150 to the secondary support 156, and an adjustment mechanism 166 (e.g., a set screw) provided on the primary support 150 is used to secure the position of the sprinkler body 106 within the hub opening.

Turning now to FIGS. 4-7B, the connector 104 according to exemplary embodiments will be described in greater detail. As shown, the connector 104 is a right-angled joint, making the shape of the letter 'T' with three (3) openings 170, 171, and 172 formed therein. The openings 170, 171, and 172 extend towards each other, centrally connecting to form a cavity 174 within the connector 104. In exemplary embodiments, the sprinkler body 106 is secured to the connector 104 at the first opening 170, the flexible conduit 110 is secured to the connector 104 at the second opening 171, and a plug 175 is secured to the connector 104 at the third opening 172. As configured, the sprinkler body 106 and the flexible conduit 110 are oriented perpendicular, or substantially perpendicular, to one another.

As shown, the flexible conduit 110 is threadably secured about the second opening 171 of the connector 104. Specifically, a fitting or mounting cuff 177 of the flexible conduit 110 includes internal threading 178 configured to mate with external threading 179 of a male member 180 defining the second opening 171 of the connector 104. In other embodiments, the second opening 171 may include internal threading, and the mounting cuff 177 and/or the flexible conduit 110 may include external threading. For example, in the embodiment shown in FIG. 5, no male member is present. Instead, the second opening 171 includes internal threading 188 for engaging corresponding threading (not shown) of the mounting cuff 177 and/or the flexible conduit 110 within the second opening 171. Alternatively, in some embodiments, the mounting cuff 177 and/or the flexible conduit 110 are welded to the connector 104. For example, in the embodiment shown in FIG. 5, one end 189 of the mounting cuff 177 may be directly welded to an exterior surface 190 of the connector 104 surrounding the second opening 171.

The flexible conduit 110 may include a flexible portion that comprises, for example, a corrugated tube, a hose, or a braided tube, which can be made from known materials including metal, rubber, etc. In an exemplary embodiment, the flexible conduit 110 is corrugated metal with a braided metal covering, which is joined to the mounting cuff 177 by welding or screw connectors. The flexible conduit 110 may be flexible along its entire length, or may include one or more flexible portions adjacent more rigid portions. In one non-limiting embodiment, the flexible conduit 110 may have a low elasticity so that when bent into a desired position, the flexible conduit 110 it maintains its shape and does not return to its original position.

As further shown, the sprinkler body 106 and the plug 175 are threadably secured within the first opening 170 and the third opening 172, respectively. Specifically, the sprinkler body 106 includes external threading 181 configured to mate with corresponding internal threading 182 provided along an interior surface of the connector 104 defining the first opening 170, while the plug 175 includes external threading 183 configured to mate with corresponding internal threading 184 provided along an interior surface of the connector 104 defining the third opening 172. In some embodiments, the plug 175 is provided to drain water from the sprinkler assembly 100. As such, the plug 175 may include a tab or squared protrusion 185 to allow easy removal either by hand or with the aid of a tool.

During assembly and installation, the flexible conduit 110 may be threaded into the connector 104, and then the plug 175 may be threaded into the opposite side of the connector, e.g., at third opening 172. The dry-type pendent sprinkler body 106 is threaded into the connector 104, e.g., within opening 170, and then anchored to a metal panel system of the ceiling 116 with the open hub bracket 112 and fasteners 140A-B. A user may adjust the height of the connector 104 by installing the smallest size pendent length for a given metal panel ceiling thickness.

One will appreciate that at least the following advantages are achieved by the embodiments of the present disclosure. Firstly, use of the t-shaped connector satisfies certain fire code standards that prohibit use of an elbow connection to a flexible metal hose in freezer/cooler applications. Secondly, the t-shaped connector allows height to be reduce where ceiling height space is limited.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. A sprinkler assembly comprising:
   a t-joint connector;
   a sprinkler body coupled to the t-joint connector at a first opening of the t-joint connector;
   a flexible conduit coupled to the t-joint connector at a second opening of the t-joint connector, the flexible conduit coupled to the t-joint connector by a mounting cuff, one end of the mounting cuff surrounding the second opening and being welded to an exterior surface of the t-joint connector; and
   an adjustable bracket coupled to the sprinkler body, the adjustable bracket supporting the sprinkler body.

2. The sprinkler assembly of claim 1, further comprising a plug coupled to the t-joint connector at a third opening of the t-joint connector.

3. The sprinkler assembly of claim 2, wherein the plug is threadably secured within the third opening of the t-joint connector.

4. The sprinkler assembly of claim 1, further comprising a sprinkler head extending from the sprinkler body.

5. The sprinkler assembly of claim 1, wherein the adjustable bracket is coupled to a ceiling, the ceiling including a metal panel formed atop a layer of insulation.

6. The sprinkler assembly of claim 5, further comprising a set of fasteners coupling the adjustable bracket to the metal panel.

7. The sprinkler assembly of claim 1, wherein the sprinkler body is a dry-type pendent sprinkler body.

8. The sprinkler assembly of claim 1, wherein the sprinkler body is threadably secured within the first opening of the t-joint connector.

9. The sprinkler assembly of claim 1, wherein the sprinkler body and the flexible conduit are oriented substantially perpendicular to one another.

10. The sprinkler assembly of claim 1, wherein:
   the adjustable bracket comprises a primary support and a secondary support;
   the secondary support is rotatably connected to the primary support;
   the primary support and the secondary support each define a cut out portion; and
   the sprinkler body is securely retained between the cut out portion of the primary support and the cutout portion of the secondary support.

11. A sprinkler system comprising:
   a t-joint connector;
   a dry-type pendent sprinkler body coupled to the t-joint connector at a first opening of the t-joint connector;
   a flexible metal conduit coupled to the t-joint connector at a second opening of the t-joint connector, the flexible metal conduit coupled to the t-joint connector by a mounting cuff, one end of the mounting cuff surrounding the second opening and being welded to an exterior surface of the t-joint connector; and
   an adjustable bracket coupling the dry-type pendent sprinkler body to a building structure, the adjustable bracket supporting the dry-type pendent sprinkler body.

12. The sprinkler system of claim 11, further comprising a plug coupled to the t-joint connector at a third opening of the t-joint connector.

13. The sprinkler system of claim 12, wherein the plug is threadably secured within the third opening of the t-joint connector.

14. The sprinkler system of claim 12, wherein the third opening is defined opposite from the second opening.

15. The sprinkler system of claim 11, further comprising a sprinkler head extending from the dry-type pendent sprinkler body.

16. The sprinkler system of claim 11, the building structure including a ceiling comprising a metal panel formed atop a layer of insulation, wherein the adjustable bracket is coupled to the metal panel.

17. The sprinkler system of claim 16, the adjustable bracket comprising a set of fasteners coupling the adjustable bracket to the metal panel.

18. The sprinkler system of claim 11, wherein the dry-type pendent sprinkler body is threadably secured within the first opening of the t-joint connector.

* * * * *